(12) United States Patent
Szemkus

(10) Patent No.: US 8,660,706 B2
(45) Date of Patent: Feb. 25, 2014

(54) SCADA UNIT

(75) Inventor: Frank Szemkus, Berkenthin (DE)

(73) Assignee: DeWind Co., Irving, TX (US)

( * ) Notice: Subject to any disclaimer, the term of this patent is extended or adjusted under 35 U.S.C. 154(b) by 172 days.

(21) Appl. No.: 12/521,956

(22) PCT Filed: Dec. 20, 2007

(86) PCT No.: PCT/EP2007/011234
§ 371 (c)(1),
(2), (4) Date: Nov. 12, 2009

(87) PCT Pub. No.: WO2008/080564
PCT Pub. Date: Jul. 10, 2008

(65) Prior Publication Data
US 2010/0057265 A1    Mar. 4, 2010

(30) Foreign Application Priority Data

Jan. 4, 2007 (DE) .......................... 10 2007 001 121
Jun. 5, 2007 (DE) .......................... 10 2007 026 176

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*F03D 9/00* (2006.01)
*H02P 9/04* (2006.01)
*G06F 15/16* (2006.01)

(52) U.S. Cl.
USPC ................ 700/287; 290/44; 290/55; 709/203

(58) Field of Classification Search
USPC .................. 700/286, 287, 295; 702/3, 14, 61; 709/203; 290/43, 44, 54, 55
See application file for complete search history.

(56) References Cited

U.S. PATENT DOCUMENTS

| | | | |
|---|---|---|---|
| 6,526,323 B1 | 2/2003 | Miyajima et al. | |
| 6,751,562 B1* | 6/2004 | Blackett et al. | 702/61 |
| 6,925,385 B2* | 8/2005 | Ghosh et al. | 702/14 |
| 6,961,641 B1* | 11/2005 | Forth et al. | 700/295 |
| 7,013,202 B2 | 3/2006 | Farina et al. | |
| 7,013,203 B2* | 3/2006 | Moore et al. | 700/286 |
| 7,188,003 B2* | 3/2007 | Ransom et al. | 700/286 |
| 7,523,001 B2* | 4/2009 | Morjaria et al. | 702/3 |

(Continued)

FOREIGN PATENT DOCUMENTS

| | | |
|---|---|---|
| DE | 10030781 A1 | 1/2002 |
| DE | 10065314 A1 | 7/2002 |
| WO | WO 03/007048 A1 | 9/2003 |

OTHER PUBLICATIONS

Stanley, SA. An Open Source SCADA Toolkit. IEEE Power Engineering Society General Meeting. Jun. 18-22, 2006. 2 pages. ISBN: 1-4244-0493-2. Digital Optical Identifier: 10109/PES.2006.709143.

(Continued)

*Primary Examiner* — Crystal J Barnes-Bullock
(74) *Attorney, Agent, or Firm* — Sheppard, Mullin, Richter & Hampton LLP

(57) ABSTRACT

In order to improve a decentralized control and data recording unit (2) (SCADA unit) for installation in decentralized energy resources (DER), in particular, wind turbine units, and/or for decentralized use at the site of a decentralized energy resource (DER), in particular a wind turbine unit, wherein this control and data recording unit comprises a control unit, in particular a turbine control unit (11), for controlling the decentralized energy resources (DER), in particular wind turbines, a database (10) for storing operating data and/or operating parameters, and also a network communications interface (13) for exchanging data and/or control commands with external units (1, 14, 15, 29) via an external network (7), so that this control and data recording unit can be better integrated into the business processes of stakeholders and have the capability of flexibly adapting to different systems, changing customer wishes, and also changing hardware, it is proposed that said unit have a SCADA operating system kernel (9) for controlling and/or managing the turbine control unit (11), the database (10), and the communications unit (13).

21 Claims, 6 Drawing Sheets

(56) References Cited

U.S. PATENT DOCUMENTS

Figure 1:
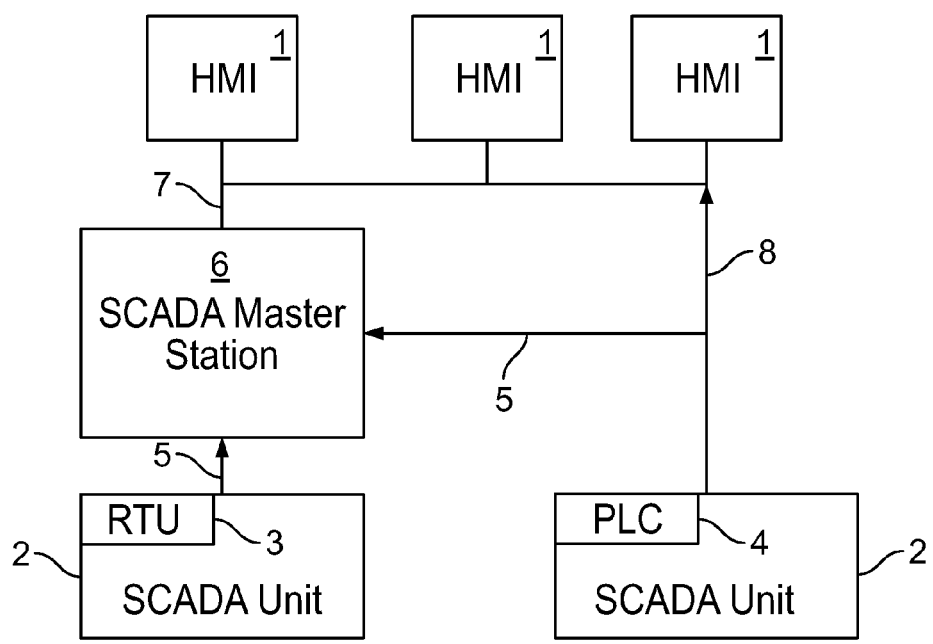

| | | | |
|---|---|---|---|
| 7,908,348 B2* | 3/2011 | Kumar et al. | 709/220 |
| 7,960,850 B2* | 6/2011 | Rasmussen | 290/44 |
| 2002/0029097 A1 | 3/2002 | Pionzio, Jr. et al. | |
| 2004/0015543 A1* | 1/2004 | Schmidt et al. | 709/203 |
| 2004/0156352 A1 | 8/2004 | Freeman et al. | |
| 2004/0181549 A1 | 9/2004 | Pate | |
| 2004/0230377 A1 | 11/2004 | Ghosh et al. | |
| 2004/0235784 A1 | 11/2004 | Jomaa et al. | |
| 2005/0090937 A1 | 4/2005 | Moore et al. | |
| 2009/0281675 A1* | 11/2009 | Rasmussen et al. | 700/287 |
| 2011/0040550 A1* | 2/2011 | Graber et al. | 703/18 |
| 2012/0066544 A1* | 3/2012 | Ichinose | 714/4.12 |
| 2012/0205912 A1* | 8/2012 | Wakasa et al. | 290/44 |

OTHER PUBLICATIONS

Wu, FF et al. Power System Control Centers: Past, Present, and Future. Proceedings of the IEEE. vol. 93. No. 11. Nov. 2005. pp. 1890-1908.

Cavalieri, S et al. Definition of a Generalised Interface for the Management of Large Utilities Plants. 2004 IEEE International Symposium on Industrial Electronics. May 4-7, 2004. pp. 745-750. ISBN: 0-78-03/8304-4. Digital Optical Identifier 10.1109/ISIE.2004.1571899.

Williams Stallings, Operating Systems, 1992, pp. 133-143, 570-616 MacMillan Publishing Company.

Stuart A. Boyer, SCADA:Supervisory Control and Data Acquisition, 3rd. ed., 2004, ISA—The Instrumentation, Systems, and Automation Society, United States.

Daniel Bachfeld, War der Wurm drin? IT-Sicherheit in der US-Stromversorgung, c't magazin, c't 18/03.

Microsoft Corp., Microsoft Windows XP Reviewers Guide, Aug. 2001, pp. 53-58.

Apple Computer, Inc., Apple Remote Desktop Administrator's Guide, 2006, pp. 9-22.

* cited by examiner

SCADA UNIT

The present invention relates to a decentralized control and data recording unit (SCADA unit) for installation in decentralized energy resources (DER), in particular, wind turbine units, and/or for decentralized use at the site of a decentralized energy resource (DER), in particular, a wind turbine unit, comprising a control unit, in particular, a turbine control unit, for controlling the decentralized energy resources (DER), a database for storing operating data and/or operating parameters, and also a network communications interface for exchanging data and/or control commands with external units via an external network.

Such SCADA units are common in connection with different decentralized energy resources (DER). DER in which SCADA units according to the class are used are, for example, solar installations, biofuel plants, or wind power installations.

Decentralized energy resources, especially wind-turbine installations, are becoming increasingly more important and more economical energy sources within power supply systems. For this reason, decentralized energy sources are being erected worldwide. In the operation of decentralized energy resources (DER), in principle, one must distinguish between the customers of the (DER) and also the interest holders of the (DER). In this sense, stakeholders include engineering firms, manufacturing companies, and also service companies.

Between the mentioned parties, communications are desired in the sense of a data exchange of technical data concerning the operation of the DER. For this purpose, control and data recording units according to the class are used. These are known in English under the acronym SCADA units, wherein SCADA stands for supervisory control and data acquisition. For the mentioned parties, it is of interest to call up operating data of a wind turbine, in order to further process this in a specific way. For example, for electricity suppliers it is important to call up the actual quantity of current supplied by a wind power installation, for example, for the purpose of billing. For engineering firms, service-relevant data, such as, for example, operating duration, operating profile, or actual operating parameters are often of interest. It is also desired to influence the control of the DER from the outside through the transmission of control commands. Due to the fact that the mentioned parties are not usually located on site at the decentralized energy resource, there must be the possibility for remote data polling or for bidirectional data exchange. To guarantee this remote data exchange, SCADA units according to the class are provided with a network communications interface.

A SCADA unit according to the class is known, for example, from U.S. Pat. No. 7,013,202 B2 in connection with a wind power installation. In the patent it is disclosed that, in a wind park, each individual wind turbine is equipped with a local turbine controller, a database, and also a turbine control and data recording unit, called TCS. Each wind turbine is connected via the TCS to a wind park network, wherein the wind park network establishes the connection of the individual wind turbines to a so-called SCADA master unit. The wind park network is a local network. A connection with an external network is possible exclusively via a network interface on the side of the SCADA master. Thus, communications between the known wind turbine-based SCADA unit and the groups named above are possible exclusively via the SCADA master. The data communications model that is implemented in connection with the known SCADA unit thus corresponds to a master-slave configuration. This has the disadvantage that, if the SCADA master fails, all of the slaves connected to this master, thus, all of the wind turbine-based SCADA units connected to this master, can no longer be reached. Another disadvantage is that SCADA masters usually represent cost-intensive systems that involve a considerable percentage of the procurement costs for wind power installations. Finally, it is a disadvantage that, in the case of heterogeneous wind parks in which different wind turbine units are operated in parallel, several different SCADA databases are required that are to be evaluated by the operators. The integration in databases of operators and service companies is thus made more difficult. Furthermore, in this known embodiment of SCADA units, the groups with interests in the wind power installations are tied to the databases of the SCADA provider. Therefore, it is rarely possible to flexibly adapt to changes to the data structure on the side of the groups with interests in the wind power installations.

In another known decentralized SCADA unit of the type named above, the SCADA units are equipped as memories of programmable controllers (SPS) in the form of a programmable logic circuit (PLC). By means of this PLC, direct communication is possible between human-machine interfaces on the sides of the different interest holders and the DER, in particular, wind power installation. In this respect, a PLC-based SCADA unit of the architecture described above and based on a master-slave model is superior, because a centralized master is not connected therebetween. However, a disadvantage of PLC-based direct communications is that the PLC is possible only by means of manufacturer-specific protocols and matching, similar manufacturer-specific devices. Through the use of a PLC-based variant of a SCADA unit according to the class, a very tight manufacturer-specific coupling is produced between those with interests in the DER and the SCADA unit. This produces the disadvantage that a flexible adaptation to customer desires and system changes from those with interests in DER or the like is not possible. In this way, the demands of the interest holders are met disadvantageously only with much difficulty and with time delays.

In general, at the present time a growing heterogeneity of DERs, especially in the case of wind parks, is being observed with respect to the represented system manufacturers. Furthermore, the demands on functionality of a SCADA unit according to the class for each DER interest holder are considerably different. The business models of the interest holders change within short time intervals, so that the demand has arisen to be able to adapt the SCADA units quickly and flexibly to such changes. Simultaneously, the demands of interest holders on data processing and data management for data of the DERs are increasing. In addition, to an increasing degree there is the need to integrate data of the DERs into the business processes of the interest holders.

Thus, the present invention is based on the problem of improving a SCADA unit according to the class such that better incorporation into the business processes of the interest holders is possible with flexible adaptation possibilities to different systems, changing customer desires, and also changing hardware. In addition, the error susceptibility for data exchange with a SCADA unit according to the class should be reduced and the investment costs for DER systems should be reduced.

According to the invention, this problem is solved for a SCADA unit according to the class in that it includes a SCADA operating system kernel for controlling and/or managing the control unit, the database, and the communications unit. In this way, the necessity of a separate SCADA master is eliminated. This advantageously makes neither a SCADA protocol nor a SCADA database necessary. Instead, by means of the operating system kernel provided in the SCADA unit, direct communications between the interest holders of the DER and the SCADA unit are possible. Here, the interest holders of the DER are not tied to the databases of a SCADA provider. Advantageously, direct support of the data infrastructure of the interest holders is possible, for example, through standard data services. The operating system kernel provided on the side of the DER allows SCADA components to be assembled and switched flexibly, in order to correspond to short-term changes in business models of the interest holders of the DER. With the SCADA unit according to the invention, the interest holders are put in the position to poll necessary data via the DER directly from the SCADA unit, in order to devise models, service plans, etc. The SCADA unit according to the invention is suitable in connection with a DER, such as solar power installations, biofuel plants, or wind power installations. So-called virtual power plants that are an interconnection of several DERs could be operated with the DER according to the invention. For example, a virtual power plant could be a virtual interconnection of wind power installations, solar energy installations, and also biofuel plants.

The SCADA unit according to the invention is improved when the operating system kernel has a data region that is publicly accessible via the network communications center. This public data region can be addressed by the interest holders via an external network, in order to call up various data on the DER. For example, if the DER is a wind power installation, then data could be called up, for example, on the wind turbines.

In order to prevent improper access to certain data and/or controllers due to the possibility of direct data communications in the SCADA unit according to the invention, the operating system kernel has a protected data region that is not publicly accessible via the network communications interface.

In an advantageous implementation of the invention, the database is implemented in the protected data region. For example, if parameters for the operation and the control of the DER are stored locally in the database, it is advantageously guaranteed through this measure that unauthorized access via an external network is excluded.

In order to guarantee autonomous operation of the SCADA unit according to the invention, it is provided in an advantageous implementation of the invention that the database is constructed for long-term storage, in particular, for the evaluation of long-term trend data. In contrast, in a few known SCADA units, only databases that are suitable for short-term buffering of small data packets are provided. Such databases could be operated differently from the invention consistently only in connection with an additional, external database, so that, in contrast with the invention, autonomous operation is not possible.

In another advantageous implementation of the invention, it is provided that a local communications unit for communications between the operating system kernel and the DER is implemented in the protected data region. The DER can have, for example, various measurement converters that give information on its operation. The recording of this data within the protected data region then allows a selective release of data or also the retention of individual sets of data. Similarly, the local communications unit serves for the transmission of control parameters from the operating system kernel to corresponding control elements of the DER. In this case, it is also advantageous to protect this functionality from unauthorized access via external networks.

According to another favorable implementation of the invention, a publicly accessible data region is constructed for the execution of one or more software-based services. The SCADA unit according to the invention can be operated in this way advantageously according to a so-called "service oriented architecture," wherein the software-based services can be used or called from the outside.

It is especially useful for the different interest holders of wind power installations when the software-based service includes the transmission of real-time data of the DER. With the SCADA unit according to the invention, it is possible in this way to access data of the DER in real time directly, without a SCADA master being connected in the middle.

Alternatively or additionally, according to the invention of the software-based service, the transmission of data evaluations concerning the DER can include, in particular, production data, output data, time series, error tracking.

So that the software-based services offered by the operating system kernel can be located by external users and so that their existence can be managed, in another advantageous implementation of the invention it is provided that the operating system kernel has a directory and/or a mechanism (service repository) for locating software-based services. In this way, it is guaranteed that the services can also be used by users. In a dynamic service-oriented architecture in which services can be automatically registered or unregistered, such a directory is very helpful. According to another advantageous implementation of the SCADA unit according to the invention, this unit has a human-machine interface (HMI), in particular, a visual interface. For example, there can be a display of important operating data that allows it to read operating data directly on site to the service personnel at the site of the wind turbine, without the switching of a SCADA master or the like. According to the invention, the interface could also have a keyboard or the like, in order for it to allow service personnel at the site of the DER to change its operating parameters or in order to request special data that is to be displayed.

In order to construct the SCADA unit according to the invention for data communications via the Internet, in a special construction of the invention it is provided that the network communications interface is constructed for communications with the external network by means of the TCP/IP communications protocol.

In another especially favorable construction of the invention, the software-based services can be called via the SOAP communications protocol. For this purpose, the SOAP protocol is widely distributed, so that a SCADA unit according to the invention that is the most universally applicable as possible is guaranteed.

Likewise, in the interest of standardization of communications with the SCADA unit according to the invention, in another advantageous implementation, the directory and/or the mechanism (service repository) is constructed for communications via at least one of the protocols WSDL, UDDI, WS-Instruction. Here, WSDL stands for Web Service Description Language, UDDI stands for Universal Description, Discovery and Integration, WS stands for Webservice Inspection.

The acronym SOAP stands for Simple Object Access Protocol.

In a preferred embodiment, the invention is described with reference to drawings, wherein additional advantageous details are to be taken from the figures of the drawings. Functionally identical parts are provided with identical reference symbols.

Figure 2:
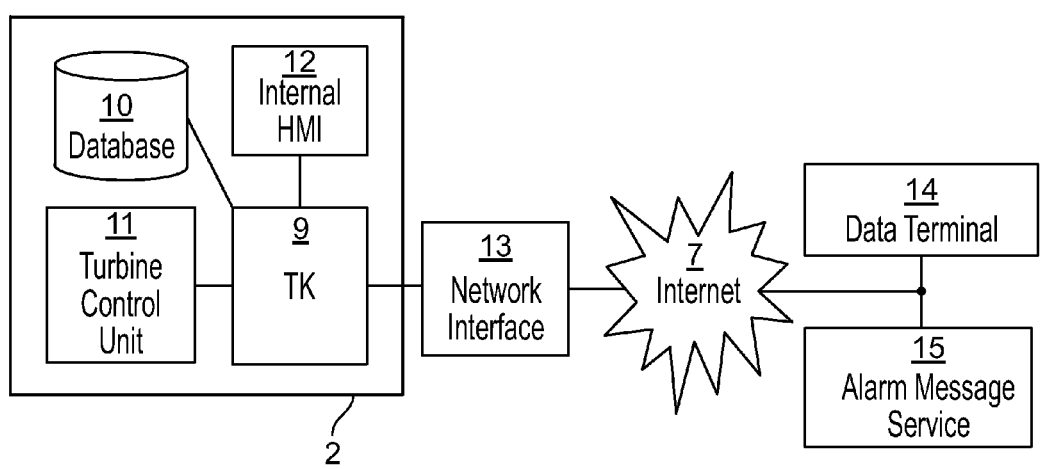
Figure 3:
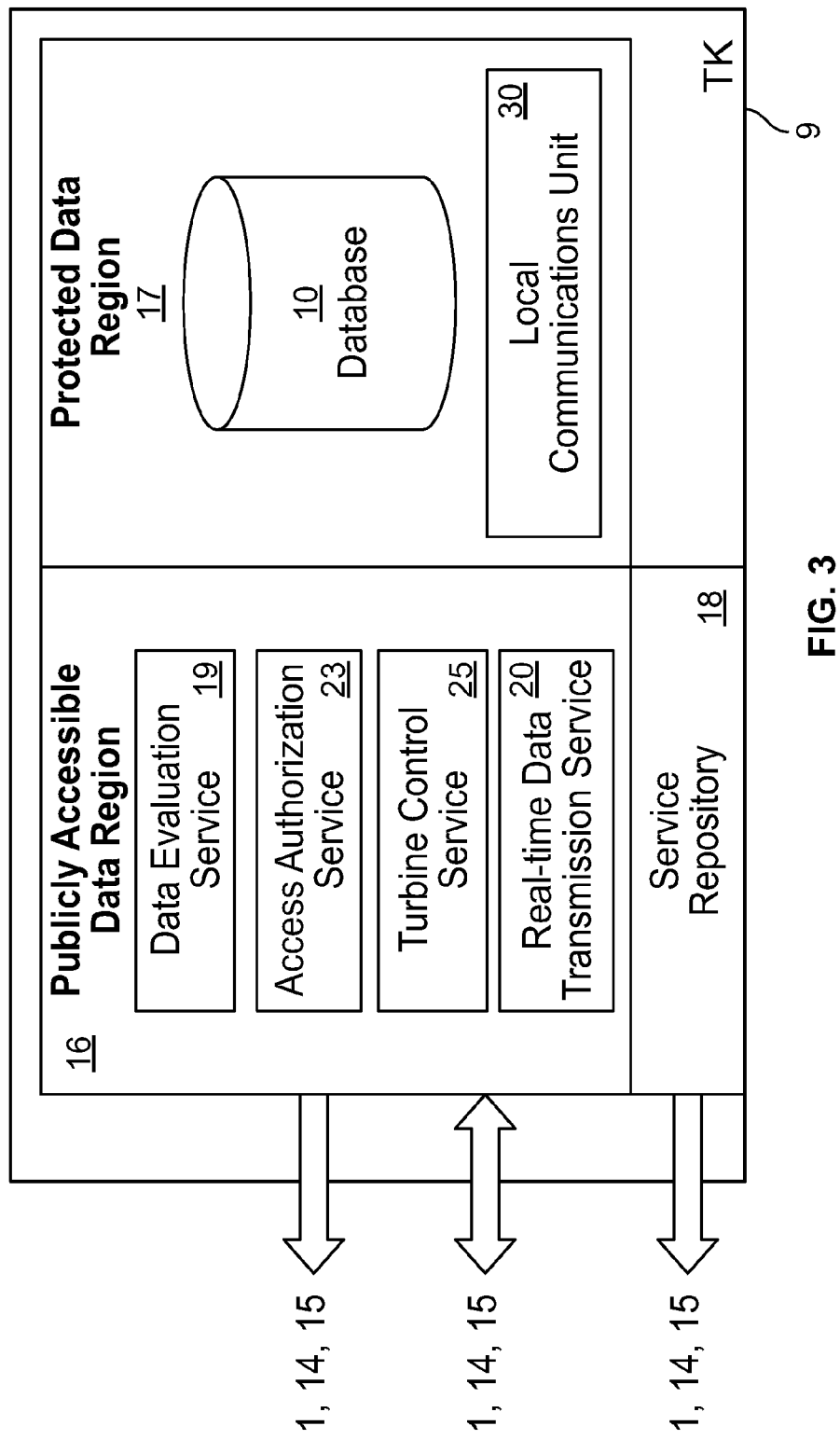
Figure 4:
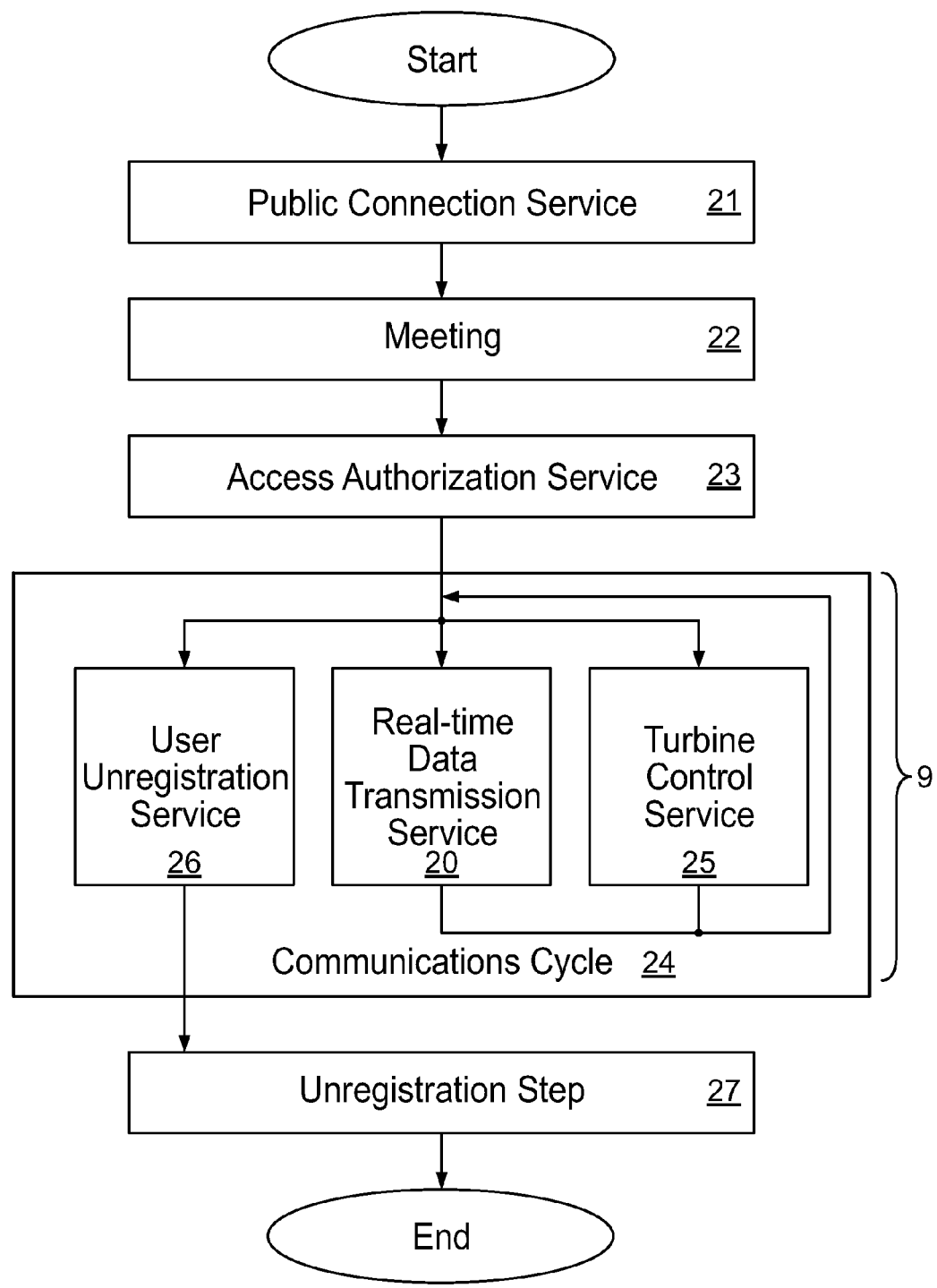
Figure 5:
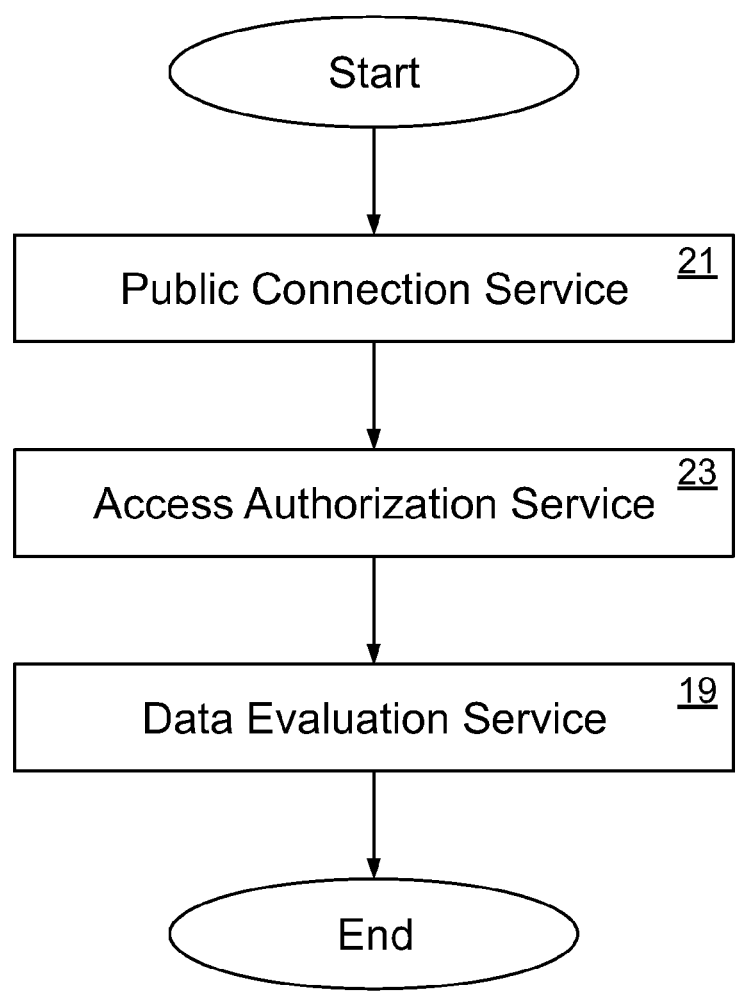
Figure 6:
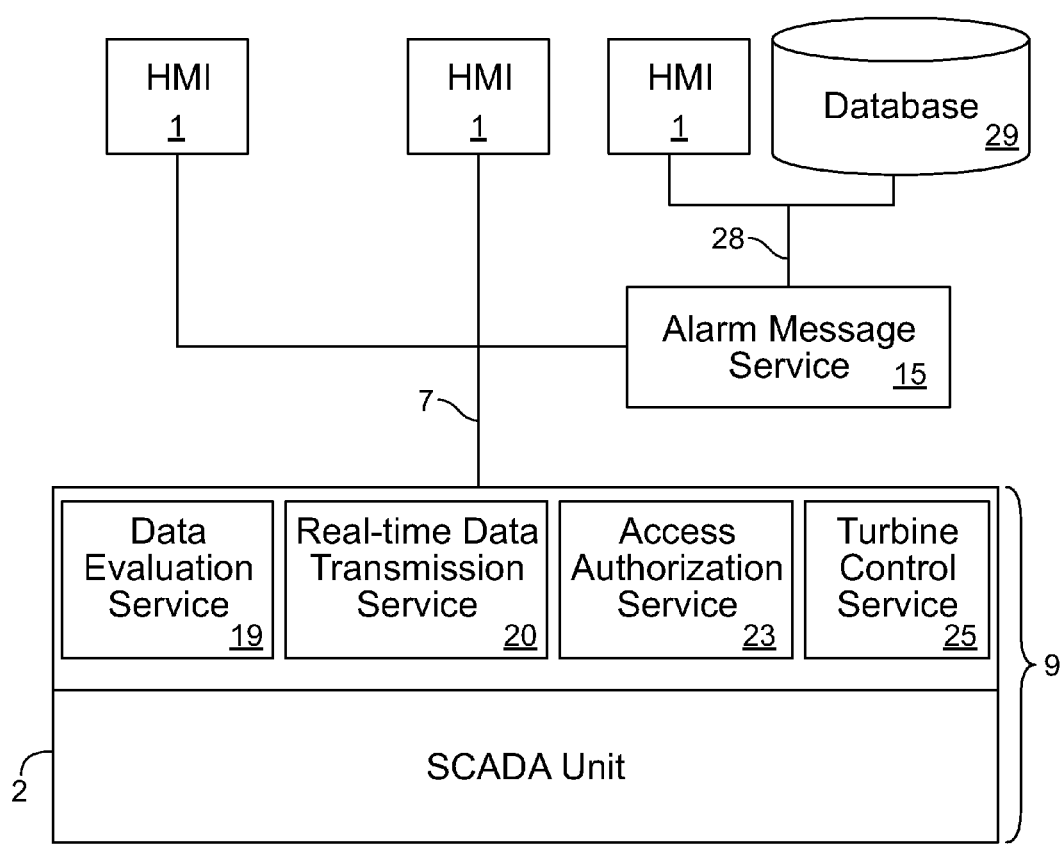

Shown in detail in the figures of the drawings:

FIG. 1, schematic diagram of the communications architecture using the example of a wind power turbine according to two variants of the state of the art, FIG. 2, schematic diagram of the communications architecture using a SCADA unit according to the invention, FIG. 3, schematic diagram of the inner architecture of the operating system of the SCADA unit according to the invention, FIG. 4, flow chart for illustrating the communications sequence with the SCADA unit according to the invention for calling software-based services from the outside, FIG. 5, flow chart for illustrating the communications with the SCADA unit according to the invention for calling analytical data, FIG. 6, schematic diagram of another special communications architecture using the SCADA unit according to the invention.

In FIG. 1, for better understanding of the advantages of the invention, the communications will be shown using the example of a wind turbine initially for defining two currently typical architectures according to the state of the art. To be seen in FIG. 1 are, as examples, three human-machine interfaces 1 shown only schematically. In addition, in the lower part of the schematic diagram according to FIG. 1, two control-data recording units (also called SCADA units 2) are shown. Both SCADA units 2 are installed locally on site in a wind turbine unit. This is not visible in the schematic diagram. The SCADA unit 2 shown in the picture at the bottom left is constructed as a wind turbine controller 3 in the form of a SCADA slave. The wind turbine controller 3 constructed as SCADA slave in the SCADA unit 2 is connected via a local network 5 to a higher-level SCADA master station 6. The SCADA master station 6 is provided outside of the wind turbine unit and, in particular, outside of the SCADA unit 2. The human-machine interfaces 1 are connected to the SCADA master station 6 via an external network 7, for example, via the Internet. This architecture according to the left communications branch in FIG. 1 corresponds to the principle according to U.S. Pat. No. 7,013,203 B2. Communication between human-machine interfaces 1 with the wind turbine controller 3 within the SCADA unit 2 is not directly possible, but instead always requires communication between the human-machine interface 1 and the SCADA master station 6. For example, if the SCADA master station 6 fails, then communication between the human-machine interface 1 and the wind turbine controller 3 within the SCADA unit 2 is not possible.

The SCADA unit 2 shown in FIG. 1 at the bottom right is provided with a memory programmable control unit 4. The memory programmable control unit 4 is connected to the SCADA master station 6 via a local network 5. On one side, communications are possible on this channel between the human-machine interfaces 1 and the memory programmable control unit 4 within the SCADA unit 2 as described above through switching of the SCADA master station 6. In the case of the SCADA unit 2 with a memory programmable control unit 4, however, direct communications between the human-machine interface 1 and the SCADA unit 2 are also possible via a direct data connection 8. The communication via the direct data connection 8 is possible disadvantageously only via specific protocols and devices adapted to the memory programmable control unit 4. The specific devices must also be present on the side of the human-machine interface 1 that communicates with the memory programmable control unit 4 within the SCADA unit 2. Flexible adaptation of the communications is rarely possible in this way.

In contrast, in FIG. 2 the architecture of communications between external devices and a SCADA unit 2 according to the invention is shown schematically. For example, the communications will be explained for a wind power installation. The SCADA unit according to the invention, however, could be used in the same way for decentralized energy resources, such as solar-power installations or biofuel plants or any other DER. The wind turbine-based SCADA unit according to a preferred embodiment of the invention has a decentralized kernel 9 within the turbine (also called turbine kernel below) as a central functional unit. A database 10, a turbine control unit 11, and also an internal human-machine interface 12 are connected to the turbine kernel 9 within the SCADA unit 2 according to the invention. The internal human-machine interface 12 can be, e.g., a computer terminal with a keyboard and monitor. The turbine kernel 9 can be either integrated locally into the wind turbine unit or implemented on a microprocessor. Alternatively, the turbine kernel 9 could also be partially or entirely included as software within the turbine controller 11.

According to FIG. 2, a network interface 13 is connected to the SCADA unit 2. The network interface 13 connects the turbine kernel 9 within the SCADA unit 2 according to the invention that is integrated into the wind turbine unit to external devices via the external network 7. The external network 7 can similarly be the Internet, a Wide-Area Network (WAN), or a LAN (local area network). As preferred examples of external human-machine interfaces 1, the data terminal 14 and also an alarm message service 15 are connected to the turbine kernel 9 via the external network 7.

FIG. 3 shows the inner construction of the turbine kernel 9 that is located according to the invention within the SCADA unit 2 integrated in the wind turbine unit. Although the preferred embodiment is described with reference to a wind power installation and reference is therefore made to a turbine kernel, the invention is equally related to SCADA units for solar power installations, biofuel plants, and other decentralized energy resources. Here, according to the invention, the kernel is independent of the DER to be controlled. As FIG. 3 shows schematically, a publicly accessible data region 16, a protected data region 17, and also a service repository 18 are implemented on the turbine kernel 9. In the publicly accessible data region 16, various software-based services 19, 20 are implemented, that is, the software-based data evaluation services 19 and also a real-time data transmission service 20. The data evaluation services comprise, according to this special construction, a service for transmitting production data, output curves, time series, and also error tracking.

Within the protected data region 17, the database 10 is implemented. In addition, within the protected data region 17, there is a local communications unit 30 that is used for communications between the turbine kernel 9 and devices of the wind turbine. Shown schematically by arrows in FIG. 3 is a communications connection to external human-machine interfaces 1, data terminals 14, and/or alarm message services 15.

In FIG. 4, in the form of a flow chart, the process of the establishment of a communications connection for calling one of the data services 19, 20 implemented in the kernel 9 within the publicly accessible data region 16 is shown. As shown in FIG. 4, a meeting 22 with the kernel 9 is established by an interest holder of the DER by means of a public connection service 21. After establishment of the meeting 22, by means of the kernel 9 an access authorization service 23 is called, in order to verify the access authorization of the interest holder. As long as the access authorization of the service 23 is confirmed for authorization, a direct data connection is formed between the interest holder of the DER and the local SCADA unit 2 integrated into the DER by means of the kernel 9. Then, within the kernel 9 a communications cycle 24 is initiated. Within the communications cycle 24, the user can use the control services 25 of the DER and also the real-time data transmission service 20. Furthermore, within the communications cycle 24 running on a local kernel 9, the user message service 26 is available for use to the user, in order to end the communications cycle 24. In the operating mode shown in FIG. 4, the standard path of the real-time data transmission service 20 is within the local kernel 9.

After execution of the user unregistration service 26, the local kernel 9 deactivates the user data and automatically ends the user meeting in an unregistration step 27. These communications are performed via an external network, such as the Internet, directly with the SCADA unit 2 according to the invention within the DER through switching of the local kernel 9. In particular, the communications do not run via a SCADA master station at a higher level than the SCADA unit as in the case of the state of the art.

FIG. 5 shows another example of a data communications process between an external user of a DER, that is, for example, an interest holder of a wind power installation, and the SCADA unit 2 according to the invention. The establishment of a connection between an external user and the SCADA unit 2 by means of the local kernel 9 runs analogous to the method described in FIG. 4 by means of a public connection service 21 that opens a meeting 22, whereupon an access authorization service 23 checks the access authorization to the local kernel 9.

Deviating from the method described in FIG. 4, in FIG. 5, in contrast, after production of the communications cycle 24, the data evaluation service 19 implemented in the publicly accessible data region 16 of the decentralized kernel 9 is activated. The unregistration process runs analogous to the situation described in FIG. 4 and is not further shown in FIG. 5.

Finally, in FIG. 6 another preferred application possibility of the SCADA unit 2 according to the invention is sketched. As can be seen, external human-machine interfaces 1 are connected via the Internet 7 directly to the SCADA unit 2 according to the invention and call the data evaluation service 19 described in more detail above, the real-time data transmission service 20, the access authorization service 23, and/or the control service 25 of the DER. Furthermore, it can be seen that an alarm message service 15 similarly communicates via the Internet 7 with the mentioned services 19, 20, 23, 25 that are implemented within the decentralized kernel 9. By means of an alarm distribution network 28, the alarm message service 15 communicates with a human-machine interface 1 and with a database 29 on the side of the interest holder.

In this way, according to the invention, a local control and data recording unit (SCADA unit) is proposed of the type according to the class for installation in decentralized energy resources (DER), in particular, wind turbine units, and/or for decentralized use at the site of a decentralized energy resource (DER), in particular, a wind turbine unit, comprising a control unit, in particular, a turbine control unit, for controlling the decentralized energy resources (DER), a database for storing operating data and/or operating parameters, and also a network communications interface for exchanging data and/or control commands with external units via an external network, wherein, due to the switching of the local kernel 9, direct data communications are possible, without a central SCADA master having to be connected before the SCADA unit for these communications. In this way, first, procurement and operating costs of the SCADA master are saved and, second, a more flexible use is produced due to the ability to use standard communications protocols and standard communications hardware.

LIST OF REFERENCE SYMBOLS

1 External human-machine interface
 2 SCADA unit integrated in the wind turbine unit
 3 Wind turbine controller (SCADA slave)
 4 Memory programmable control unit
 5 Local network
 6 SCADA master station
 7 Internet
 8 Direct data connection
 9 Local kernel
 10 Database
 11 Turbine control unit
 12 Internal human-machine interface
 13 Network interface
 14 Data terminal
 15 Alarm message service
 16 Publicly accessible data region
 17 Protected data region
 18 Service repository
 19 Data evaluation service
 20 Real-time data transmission service
 21 Public connection service
 22 Meeting
 23 Access authorization service
 24 Communications cycle
 25 Turbine control service
 26 User unregistration service
 27 Unregistration step
 28 Alarm distribution network
 29 Database (on side of interest holder)

The invention claimed is:

1. Decentralized control and data recording unit (SCADA unit) for installation in a decentralized energy resource (DER) and/or for decentralized use at the site of a decentralized energy resource (DER), comprising a control unit for controlling the decentralized energy resource (DER), a database for storing operating data and/or operating parameters, a network communications interface for exchanging data and/or control commands with external units via an external network, and a SCADA operating system kernel for controlling and/or managing the control unit, the database, and the communications interface,
 wherein the decentralized energy resource (DER) consists of a single energy generating unit,
 wherein the SCADA operating system kernel is integrated into the decentralized energy resource (DER), and
 wherein the SCADA operating system kernel is directly accessible by the external units.

2. SCADA unit according to claim 1, wherein the operating system kernel has a publicly accessible data region that is publicly accessible via the network communications interface.

3. SCADA unit according to claim 2, wherein the publicly accessible data region is constructed for the execution of one or more software-based services.

4. SCADA unit according to claim 3, wherein the one or more software-based services includes transmission of real-time data of the decentralized energy resource (DER).

5. SCADA unit according to claim 3, wherein the one or more software-based services includes transmission of data evaluations concerning the decentralized energy resource (DER).

6. SCADA unit according to claim 5, wherein the transmission of data evaluations includes transmission of data selected from the group consisting of production data, output data, time series data, and error tracking data.

7. SCADA unit according to claim 3, wherein the one or more software-based services can be called via a SOAP communications protocol.

8. SCADA unit according to claim 1, wherein the operating system kernel has a protected data region that is not publicly accessible via the network communications interface.

9. SCADA unit according to claim 8, wherein the database is implemented in the protected data region.

10. SCADA unit according to claim 8, wherein in the protected data region, a local communications unit is implemented for communications between the operating system kernel and the decentralized energy resource (DER).

11. SCADA unit according to claim 1, wherein the database is constructed for long-term storage.

12. SCADA unit according to claim 11, wherein the database is further constructed for evaluation of long-term trend data.

13. SCADA unit according to claim 1, wherein the operating system kernel has a directory and/or a mechanism (service repository) for finding software-based services.

14. SCADA unit according to claim 13, wherein the directory and/or the mechanism (service repository) is constructed for communications via at least one of the protocols WSDL, UDDI, WSInspection.

15. SCADA unit according to claim 1, further comprising a human-machine interface (HMI).

16. SCADA unit according to claim 15, wherein the human-machine interface is a visual interface.

17. SCADA unit according to claim 1, wherein the network communications interface is constructed for communications with the external network by means of the TCP/IP communications protocol.

18. SCADA unit according to claim 1, wherein the single energy generating unit comprises one wind turbine unit.

19. SCADA unit according to claim 1, wherein the control unit is a turbine control unit.

20. SCADA unit according to claim 1, wherein the single energy generating unit comprises a solar panel unit.

21. SCADA unit according to claim 1, wherein the single energy generating unit comprises a biofuel cell unit.

* * * * *